United States Patent [19]
Jones et al.

[11] Patent Number: 5,105,062
[45] Date of Patent: Apr. 14, 1992

[54] METHOD FOR FORMING AN ELECTRODE-LEAD ASSEMBLY

[75] Inventors: Marshall G. Jones, Scotia; Sudhir D. Savkar, Schenectady, both of N.Y.

[73] Assignee: General Electric Company, Schenectady, N.Y.

[21] Appl. No.: 628,524

[22] Filed: Dec. 17, 1990

[51] Int. Cl.$^5$ .............................................. B73K 26/00
[52] U.S. Cl. ............................ 219/121.85; 219/121.72
[58] Field of Search ....................... 219/121.72, 121.85

[56] References Cited
U.S. PATENT DOCUMENTS

| | | | |
|---|---|---|---|
| 3,718,968 | 3/1973 | Sims et al. | 29/482 |
| 4,224,499 | 9/1980 | Jones | 219/121 LM |
| 4,356,376 | 10/1982 | Komanduri et al. | 219/121 LN |
| 4,564,736 | 1/1986 | Jones et al. | 219/121 L |
| 4,587,395 | 5/1986 | Oakley et al. | 219/121.64 |
| 4,673,795 | 6/1987 | Oritz, Jr. | 219/121 L |
| 4,676,586 | 6/1987 | Jones et al. | 350/96.20 |
| 4,681,396 | 7/1987 | Jones | 350/96.18 |
| 4,799,755 | 1/1989 | Jones | 350/96.18 |
| 4,844,574 | 7/1989 | Chande | 350/96.18 |
| 4,868,361 | 9/1989 | Chande et al. | 219/121.62 |
| 4,877,175 | 10/1989 | Jones et al. | 228/102 |

Primary Examiner—C. L. Albritton
Attorney, Agent, or Firm—James R. McDaniel; James C. Davis, Jr.; Paul R. Webb, II

[57] ABSTRACT

The present invention is a method for forming an electrode-lead assembly. In one embodiment, the method comprises the steps of aligning the energy outlet of an energy source with an end portion of the lead, operating the energy source so that the emitted energy heats the end of the lead and so that a melt is formed at the end portion of the lead, and allowing the melt to solidify. The solified melt is bullet-shaped and serves as an electrode.

25 Claims, 7 Drawing Sheets

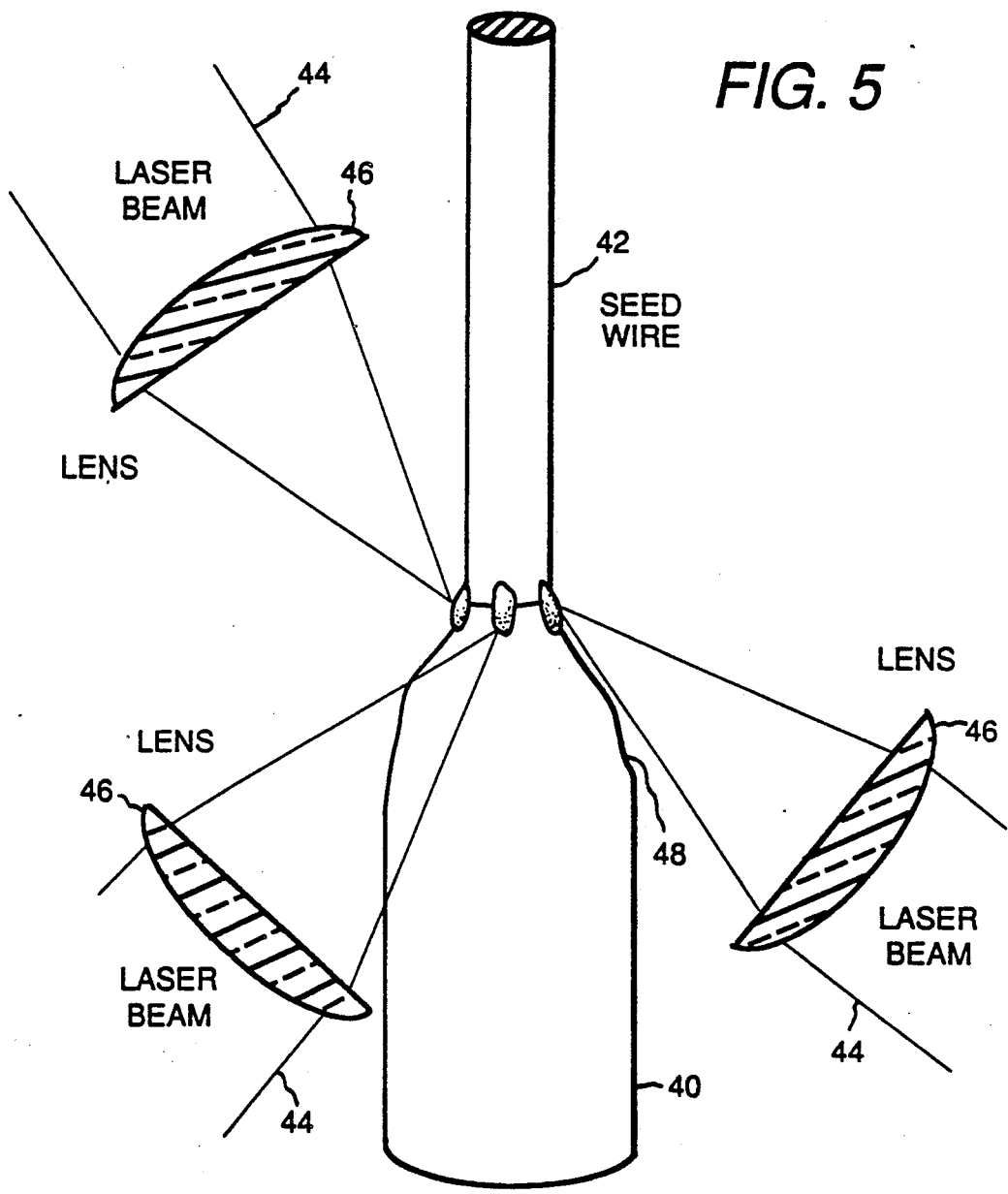

METHOD FOR FORMING AN ELECTRODE-LEAD ASSEMBLY

BACKGROUND OF THE INVENTION

1. Field of the Invention

The present invention relates to materials processing and, more particularly, relates to forming electrons from tungsten leads.

2. Related Art

Welding a first tungsten component to a second tungsten component to form an assembly generally is not considered to be feasible because the welding operation itself causes severe recrystallization of the tungsten adjacent to the melted area, i.e., the weld, between and formed by the components. This recrystallization of the tungsten causes the tungsten components to become brittle and results in a weak bond. As used herein, the term "tungsten component" refers to components composed of tungsten, alloys of tungsten, tungsten alloys including a solid suspension, tungsten including a solid suspension, or any combination of materials including tungsten.

Moreover, problems associated with welding tungsten components to other tungsten components are amplified when the tungsten components to be welded are an electrode, such as an anode, and a lead. The term "lead", as used herein, refers to an electrical conductor for conducting electricity to an electrode. The end portion of the lead which is to be bonded to the end portion of the anode typically has a very small diameter. The lead, for example, has a diameter of 0.0165 inches and the anode has a diameter of 0.040 inches. Providing a strong bond between such small working areas is very difficult.

It is known to join tungsten components to other tungsten components by brazing. Particularly, the tungsten components are aligned and held in contact at a location where a bond is to be formed. The brazing metal is then melted at the location where the bond is to be formed. The brazing metal, however, typically has a lower melting temperature than the melting temperature of tungsten. As a result of the difference between the melting temperature of the brazing metal and the tungsten, a strong bond between the tungsten components and the brazing metal is not present when the components, in operation, are subjected to elevated temperatures near the braze material melting point. Brazing techniques, therefore, do not provide sufficient bond strength between the tungsten components at elevated temperatures close to the brazing material melting point. The brazing metal may also be a source of contamination in some applications.

To overcome these problems, a method for forming an anode-lead assembly by melting back the end of a lead can be utilized. The end of the lead typically is melted with a tungsten-inert-gas (TIG) welder. When the end of the lead i smelted, a spherical-shaped portion having a larger diameter than the other portion of the lead is formed. Particularly, when the tungsten is melted, the melted tungsten forms into the spherical-shape due to surface tension. The spherical-shaped portion serves as an anode. In the TIG operation, it is difficult to control the diameter of the anode, i.e., the diameter of the spherical-shaped portion, being formed. Further, in some applications, the spherical-shape of the anode is unsatisfactory such as too large or of undesirable shape. For example, it may be preferred that the anode be bullet-shaped or conically-shaped.

One known technique to shape the anode formed by the TIG process is commonly referred to as electrical discharge machining (EDM). Particularly, subsequent to a TIG process, EDM techniques are used to cut the desired anode shape from the spherical-shaped portion of the melted lead. EDM techniques, however, typically require tens of minutes to complete and are too slow to be cost effectively used in mass production of such assemblies. Other techniques for shaping the anode such as machining and etching also require too much time and result in waste.

In commonly assigned copending U.S. patent application Ser. No. 07/622,037, "Apparatus For Welding Components", an apparatus that can be used to weld tungsten components is described. One embodiment of an apparatus in accordance with the invention described in the copending patent application comprises means for aligning the first component and the second component, means for heating at least a portion of the first component, and means for forcing the second component within a melt formed as a result of heating the first component. The heating means, in the exemplifications embodiment, is at least a first laser beam. Particularly, in the exemplification embodiment, the laser beam is a laser beam pulse emitted by a neodymium:Yttrium-Aluminum-Garnet (Nd:YAG) source and the laser beam pulse has a wavelength of 1.06 micrometers. The beam pulse is directed, for example, at a portion of the first component. The energy from the laser beam is absorbed by the first component and causes at least a portion of the first component to form a melt. It is contemplated, of course, that sources of energy other than a laser can be utilized. The energy source preferably provides highly focussed energy which generates, when absorbed, localized heat in the tungsten component.

In commonly assigned copending U.S. patent application Ser. No. 07/622,080, "Method For Welding Components", a method for welding tungsten components is described. One embodiment of a method in accordance with the invention is described in the copending patent application includes the steps of aligning the first component and the second component so that a first portion of the first component is disposed substantially adjacent a first portion of the second component, and heating at least a portion of the first component. As the first component is heated, a melt is formed at the first portion of the first component. The first portion of the second component is forced into and maintained within the melt. As the melt solidifies, a strong bond is formed between the first and second component.

The heating, in the exemplified embodiment, is provided by at least a first laser beam. Particularly, in the exemplification embodiment, the laser beam is a laser beam pulse emitted by a neodymium:Yttrium-Aluminum-Garnet (Nd:YAG) source and the laser beam pulse has a wavelength of 1.06 micrometers. The beam pulse is directed, for example, at a portion of the first component. The energy from the laser beam is absorbed by the first component and causes the melt to form. It is contemplated, of course, that sources of energy other than a laser can be utilized. The energy source preferably provides highly focussed energy which generates, when absorbed, localized heat in the tungsten component. The components to be welded could be composed of materials other than tungsten or some combination of materials including tungsten.

The above described apparatus and method can be used to weld the small working areas of a tungsten electrode and a tungsten lead. The resulting bond is a strong bond and does not result in damage to the components. Moreover, operations are performed relatively fast which facilitates mass production of the anode-lead assemblies.

It would be desirable, of course, to even further reduce the time required to form an electrode-lead assembly, and to simplify the process of forming the assembly. For example, in a welding operation, typically a relatively complex apparatus is used to hold the electrode and the lead. Eliminating a need for such a complex apparatus would be desirable, for example, because processing costs would be reduced.

It is therefore an object of the present invention to provide a method for forming an electrode-lead assembly.

Another object of the present invention is to provide a method for forming an electrode-lead assembly which eliminates a need for complex apparatus.

Still another object of the present invention is to provide a method for forming an electrode-lead assembly which facilitates reducing processing time.

Yet another object of the present invention is to provide a method for forming an electrode-lead assemble which is simple and easy to perform.

SUMMARY OF THE INVENTION

One embodiment of a method for forming electrode-lead assemblies in accordance with the present invention comprises the steps of aligning the energy outlet of an energy source with an end portion of the lead, operating the energy source so that the emitted energy heats the end of the lead and so that a melt is formed at the end portion of the lead, and allowing the melt to solidify. When the melt solidifies, and due to surface tension forces, the solidified melt is bullet-shaped.

In the exemplification embodiment, a laser beam pulse emitted by a neodymium:Yttrium-Aluminum-Garnet (Nd:YAG) source is used to heat the end portion of the lead. The laser beam pulse has a wavelength of 1.06 micrometers. The energy from the laser beam pulse is absorbed by the lead and causes the end portion of the lead to form the melt.

The present invention facilitates reducing the time required to form an electrode-lead assembly by providing a simple process to form the assembly. Further, a relatively simple apparatus can be used to facilitate practice of the present method thereby eliminating a need for a complex apparatus. The present method therefore leads to reduced processing costs.

BRIEF DESCRIPTION OF THE DRAWINGS

These and other objects of the present invention, together with further features and advantages thereof, will become apparent from the following detailed specification when read together with the accompanying drawings in which:

FIG. 5 illustrates forming an electrode-lead assembly in accordance with a third embodiment of the present invention;

DETAILED DESCRIPTION OF THE DRAWINGS

Figure 1:
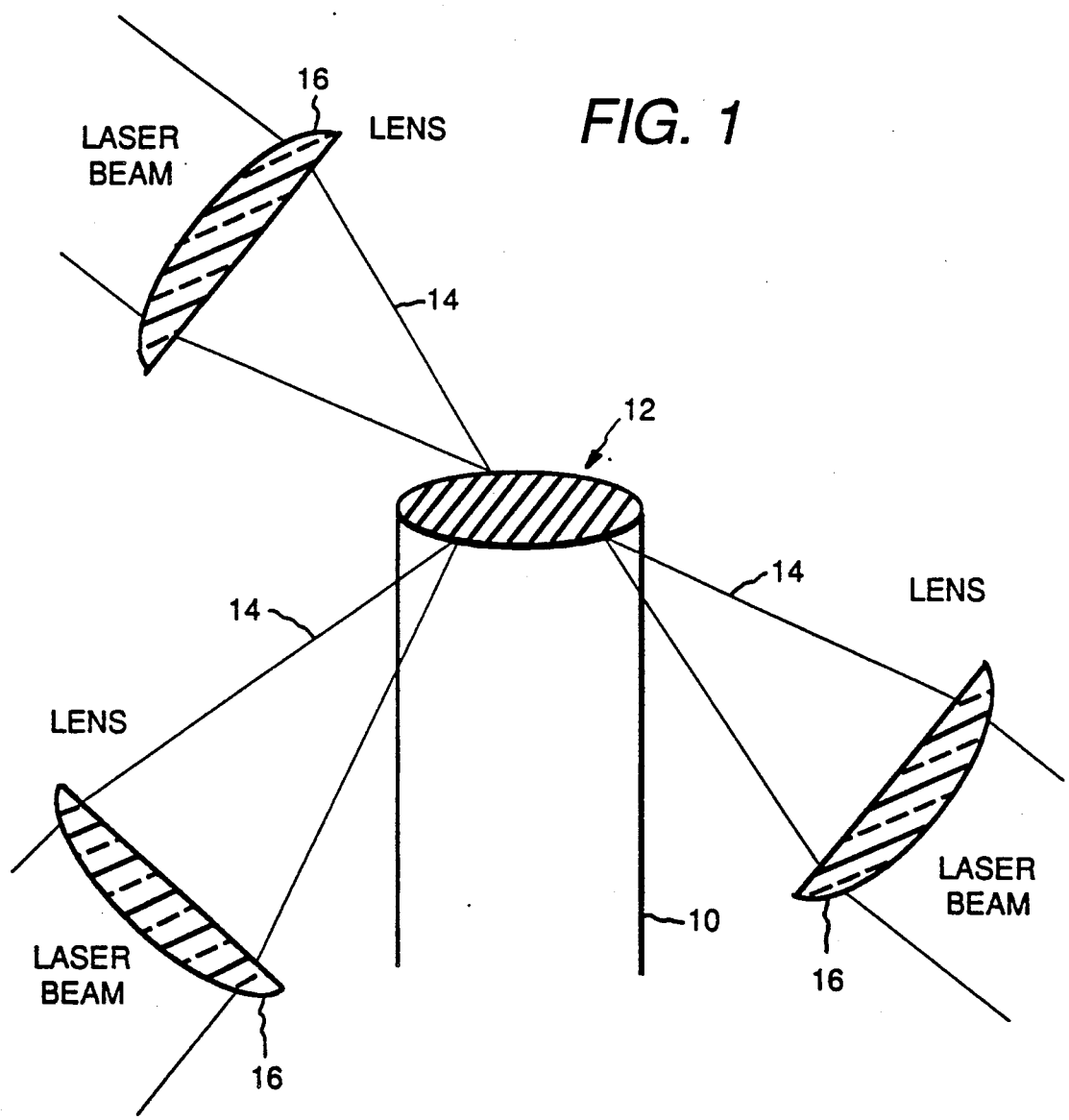
FIG. 1 illustrates forming an electrode-lead assembly in accordance with a first embodiment of the present invention.

Referring now more particularly to the drawings, FIG. 1 illustrates forming an electrode-lead assembly in accordance with a first embodiment of the present invention. Particularly, a tungsten lead 01, including an end portion 12, is shown in FIG. 1 as being heated by three laser beams 14. The lead 10, for example, is held by a clamp or lead holder which are well known in the art. The laser beams 14 are focussed onto the end portion 12 by respective lenses 16. In the exemplification embodiment, the laser beams 14, for example, are 1.06 micrometer laser beams emitted from a neodymium:Yttrium-Aluminum Garnet (Nd:YAG) laser operating in a pulsed mode. An Nd:YAG laser is a source of 1.06 micrometer wavelength energy. A commercially available laser source from Raytheon, including an Nd:YAG crystal rod, can be utilized, for example, as part of the laser source.

The laser beams 14 may be provided to the lenses 16 via respective optical fibers coupled to the Nd:YAG laser source. A manner of injecting a laser beam from a laser source into an optical fiber is described in Jones, U.S. Pat. No. 4,681,396 which is incorporated herein, in its entirety, by reference. The optical fiber transmits a beam from the laser source to an output coupler or the beam emitted directed from the optical fiber is used.

In order to provide multiple beams from a single laser source, a beam splitter which splits a beam emitted from the laser source may be utilized. Such configurations are well-known in the art. By using multiple laser beam pulses, it is believed that the heating and melting around the circumference of the lead end portion 12 causes by the respective beams will lead to more uniform melting and better control of forming the electrode.

Figure 2:
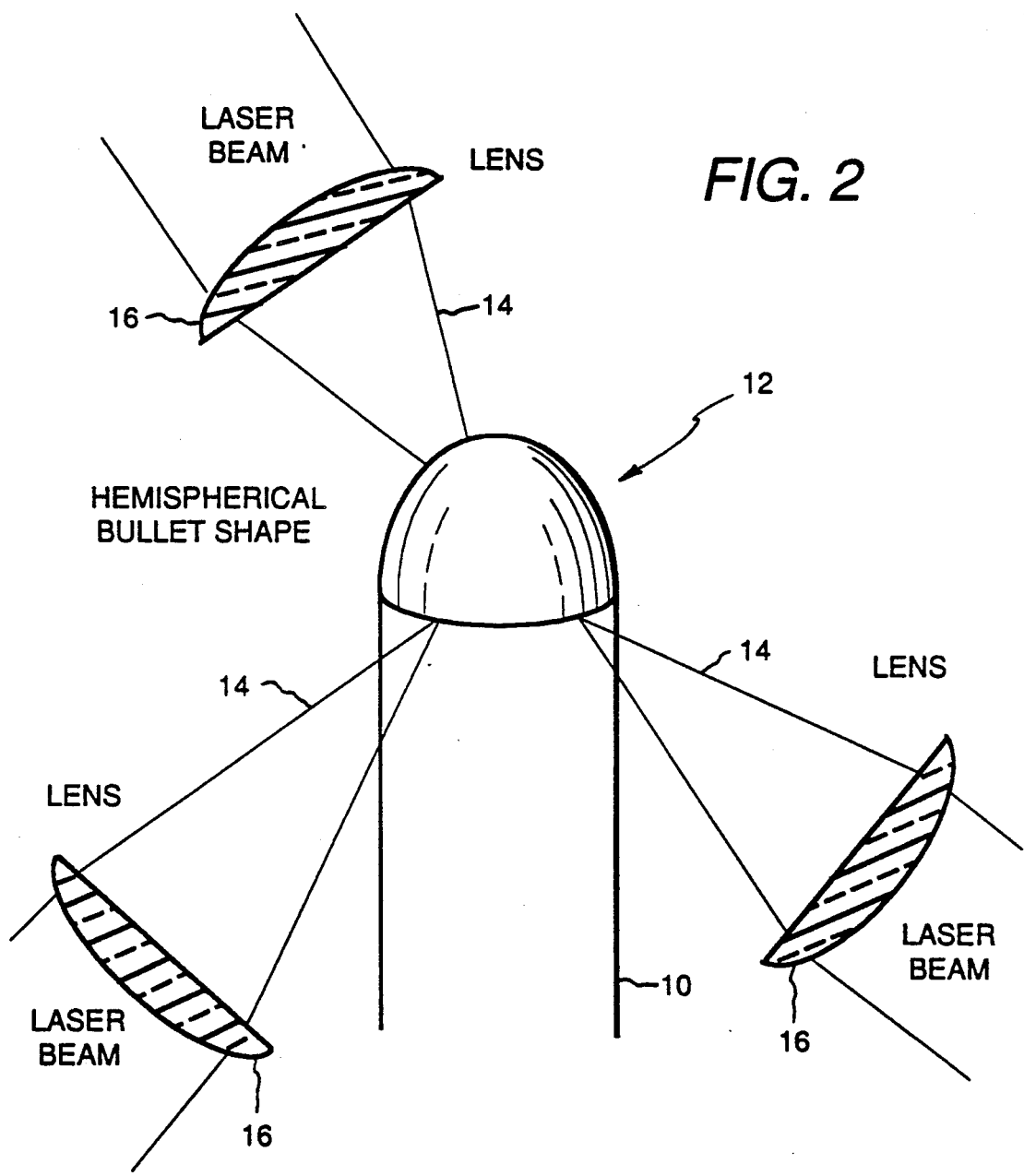
FIG. 2 illustrates an electrode-lead assembly formed in accordance with the first embodiment of the present invention.

As shown in FIG. 2, the laser beams 14 cause a melt to form at the end portion 12 of the lead 10. The end portion 12 then is allowed to solidify and the solidified melt is bullet-shaped. The solidified melt can then serve as an electrode.

It is contemplated that a single laser beam pulse can be used to form the melt at the end portion 12. As previously mentioned, however, it is believed that by using multiple laser beam pulses, more uniform heating, and therefore more uniform melting, of the end portion 12 is provided. The duration of the laser beam pulses and the power of the laser beam pulses depends on the material which composes the lead 10. The duration and power of the pulses is determined through experimentation.

Figure 3:
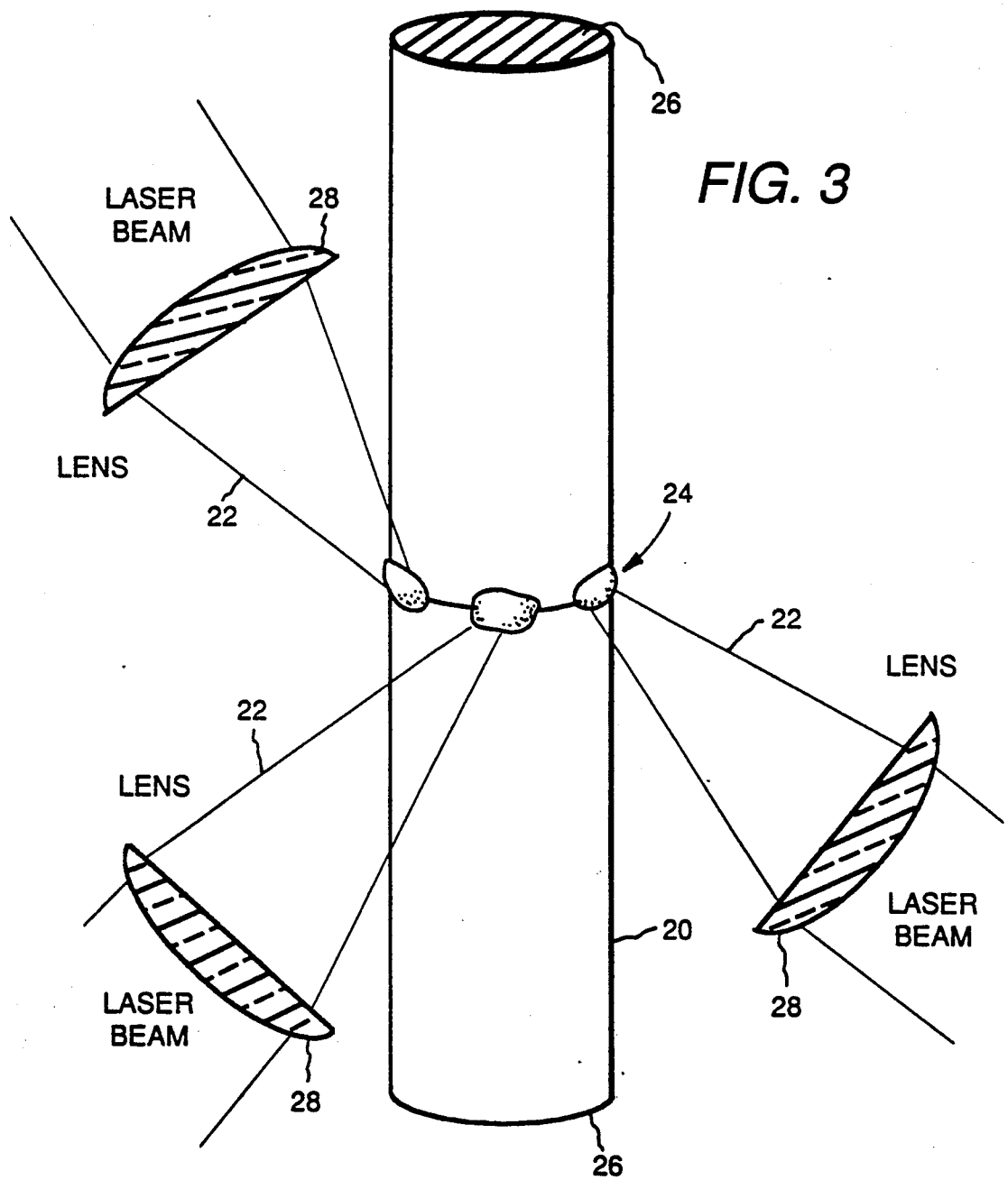
FIG. 3 illustrates forming an electrode-lead assembly in accordance with a second embodiment of the present invention.

FIG. 3 illustrates forming an electrode-lead assembly in accordance with a second embodiment of the present invention. The second embodiment is believed to have its greatest utility when it is desired that the electrode have an elliptical or conical-like shape. Particularly, a lead 20 is illustrated as being heated by laser beams 22 at a portion 24 between opposed ends 26 of the lead 20. The lead 20, for example, is held by two opposed clamps disposed at respective ends of the lead 20. The clamps, for example, compose part of a micro-tensile tester which is well known in the art. The clamps hold the respective ends of the lead 20 and apply a tensile load on the lead 20 during processing as hereinafter described. The beams 22 are focused onto the portion 24 by lenses 28. As described with reference to FIGS 1 and 2, the laser beams 22 may be provided to the lenses 28 via an Nd:YAG laser source.

Figure 4:
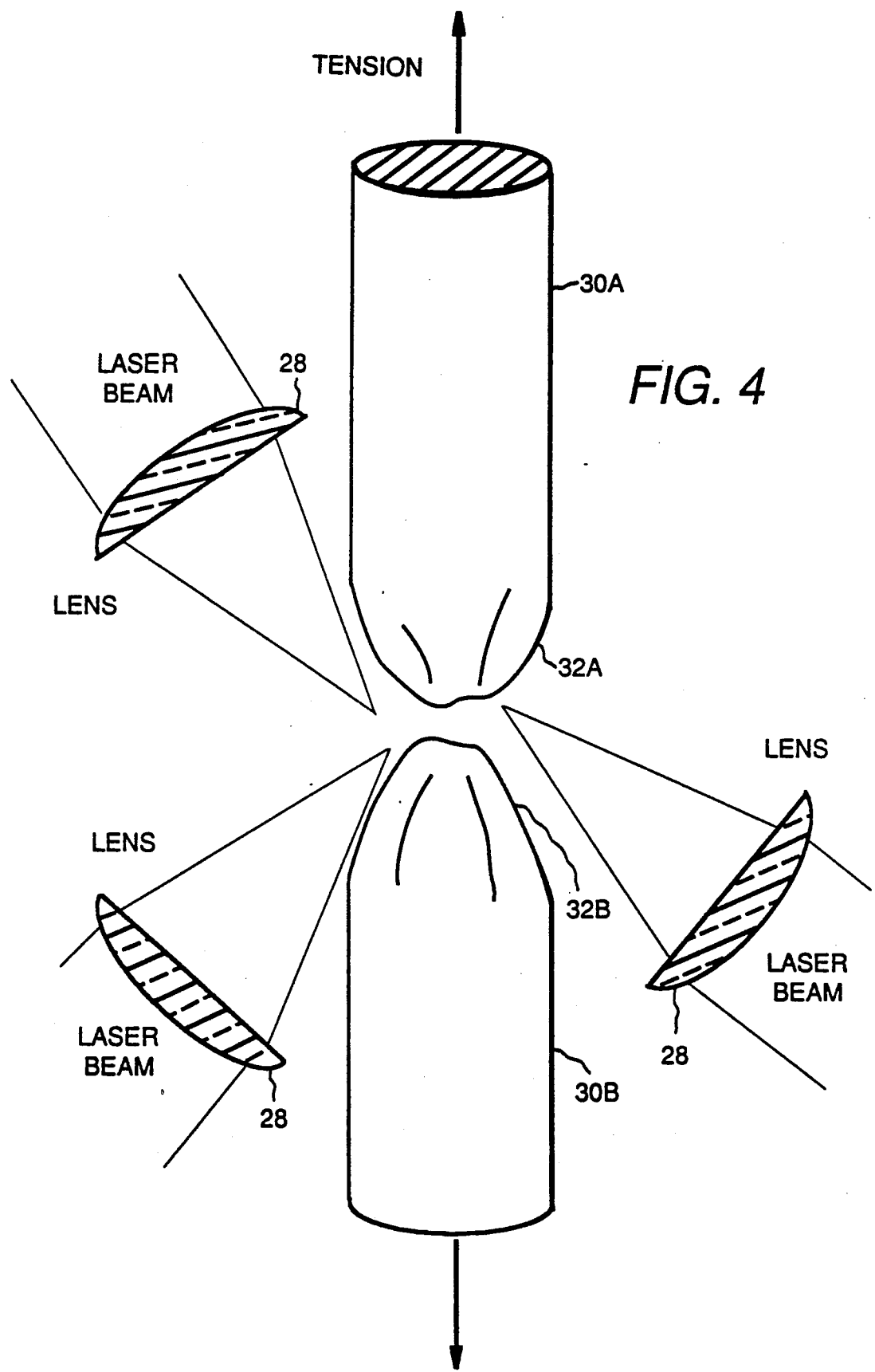
FIG. 4 illustrates forming an electrode-lead assembly in accordance with the second embodiment of the present invention.

As shown in FIG. 4, when the portion 24 is molten, or in a plastic state, a small tensile load is applied at the ends 26 of the lead 20 to separate the lead 20 into separate lead portions 30A and 30B. The separation occurs, of course, at the portion 24, i.e., within the plastic/melt zone. The tensile load is only applied when sufficient melt-thru has occurred.

Once the lead portions 30A and 30B have been formed, the end portions 32A and 32B, respectively, of the lead portions 30A and 30B, respectively, are molten. When the end portions 32A and 32B solidify, the effect of surface tension causes elliptical or conical-like shaping of the respective solidified melts. A more pointed end portion resulting from plastic strain can be provided by applying the tensile load prior to and during laser heating.

FIG. 5 illustrates forming an electrode-lead assembly in accordance with a third embodiment of the present invention. Particularly, a lead 40 and seed wire 42 are utilized to form an electrode-lead assembly. The lead 40, for example, is held by a lead clamp holder and the seed wire 42 is held by a wire feeder, such holders and feeders being well known in the art. The see wire 42 is composed of the same material as the lead 40 and has a smaller diameter, e.g., 0.1–0.2 mm, than the diameter, e.g., 1.0 mm, of the lead 40. An end of the seed wire 42 is abutted against an end of the lead 40. At the interface of the abutted ends of the wire 42 and the lead 40, laser beams 44 are applied. The laser beams 44 are focused on the interface by lenses 46. As hereinbefore described, the laser beams 44 may be provided to the lenses 46 via an Nd:YAG laser source.

As a melt forms at the interface during laser heating, the seed wire 42 and the lead 40 are axially displaced. The amount of axial displacement depends upon the desired electrode shape and can be determined through experimentation. The seed wire 42 and the lead 40 are maintained at the predetermined distance while the melt solidifies. This operation results in a tapered weld region 48. The seed wire 42 is then cut, e.g., by using a laser beam, at a desired location thereby providing an electrode-lead assembly wherein the electrode has a tapered shape. The seed wire 42 can be discarded or used in another electrode-lead forming operation. Building-up a part by adding material, e.g., from a seed wire, is known in the art as reverse machining.

Figure 6A:
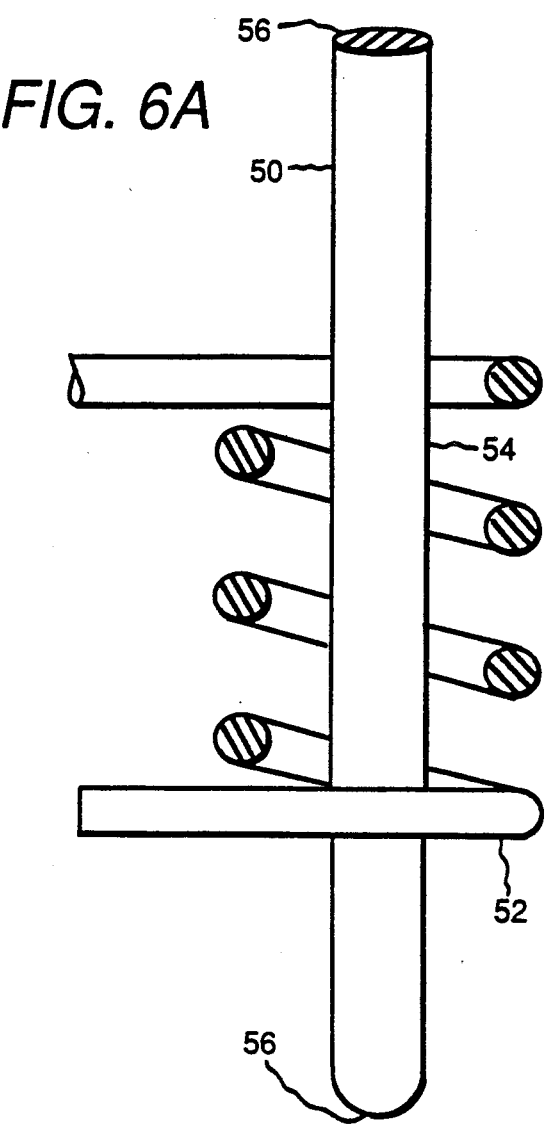
FIGS. 6A-B illustrate forming an electrode-lead assembly in accordance with a fourth embodiment of the present invention.
Figure 6B:
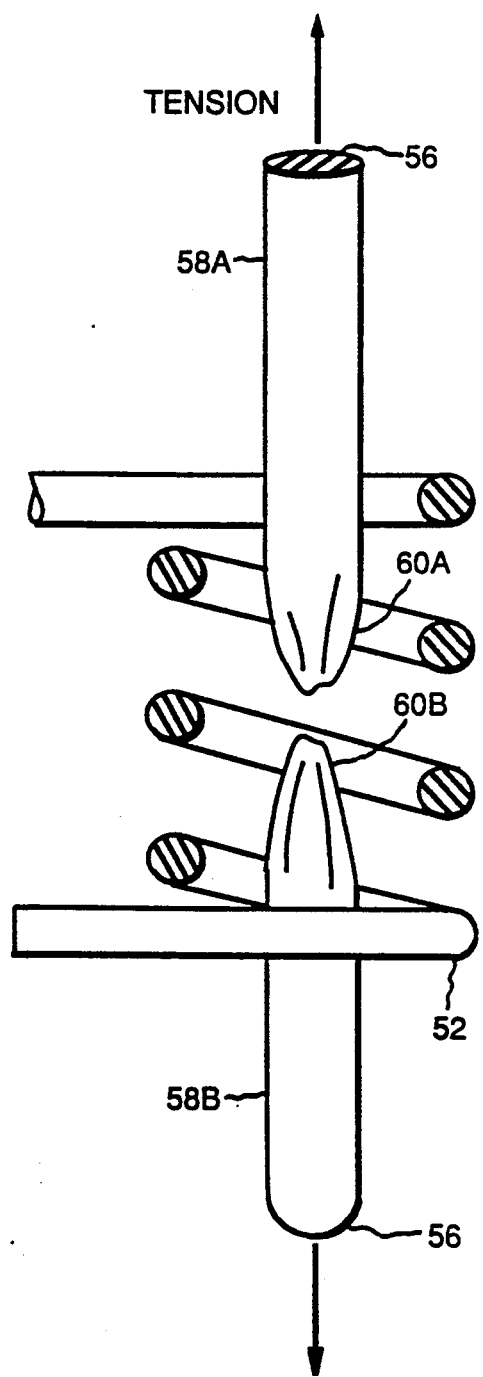

FIGS 6A–B illustrate a fourth embodiment of the present method of forming an electrode-lead assembly. Particularly, the embodiment illustrated in FIGS. 6A–B is similar to the embodiment illustrated in FIGS. 3 and 4. In FIGS 6A–B, however, the heating of a lead 50 is provided by a coil 52, i.e., induction heating, shown partially in cross-section. When a portion 54 (FIG. 6A) of the lead 50 is molten, or in a plastic state, a small tensile load is applied at the ends 56 of the lead 50 to separate the lead 50 into separate lead portions 58A and 58B (FIG. 6B). The separation occurs, of course, at the portion 54, i.e., within the plastic/melt zone. The tensile load is only applied when sufficient melt-thru has occurred. The lead 50, for example, is held by two opposed clamps disposed at respective ends 56 of the lead 50. The clamps, for example, compose part of a micro-tensile tester which is well known in the art. The clamps hold the respective ends of the lead 50 and apply a tensile load on the lead during processing.

Once the lead portions 58A and 58B have been formed, the end portions 60A and 60B, respectively, of the lead portions 58A and 58B, respectively, are molten. When the end portions 58A and 58B solidify, the effect of the surface tension causes elliptical or conical-like shaping of the respective solidified melts. A more pointed end portion resulting from plastic strain can be provided by applying the tensile load prior to and during laser heating.

Figure 7:
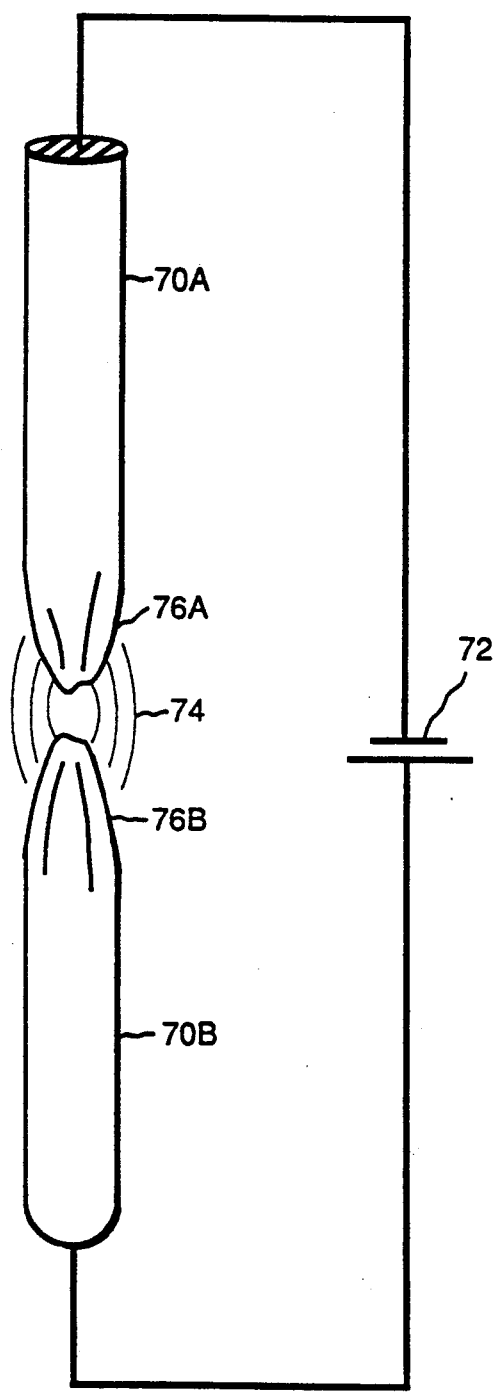
FIG. 7 illustrates forming an electrode-lead assembly in accordance with a fifth embodiment of the present invention.

FIG. 7 is provided to illustrate that subsequent to forming two lead portions 70A and 70B, a voltage 72 can be applied across the lead portions 70A and 70B so that an arc 74 forms between the lead portions 70A and 70B. The respective lead portions 70A and 70B, for example, are held by respective clamps. Particularly, end portions 76A and 76B, respectively, of the lead portions 70A and 70B, respectively, are disposed so that when the voltage 72 is applied to the respective portions 70A and 70B, the arc 74 is generated between the end portions 76A and 76B. The arc 74 causes further shaping of the end portions 76A and 76B to occur. The voltage 72 may be applied until a desired shape of the end portions 76A and 76B is provided.

While the present invention has been described with respect to specific embodiment, many modifications, variations, substitutions and equivalents will be apparent to workers in the art. It is contemplated, of course, that sources of energy other than a laser can be utilized. The energy source preferably provides highly focussed energy which generates, when absorbed, localized heat in the tungsten component. Further, the component from which the electrode-lead assembly is to be formed could be composed of materials other than tungsten or some combination of materials including tungsten. Accordingly, it is intended that the invention be limited only by the spirit and scope of the appended claims.

What is claimed is:

1. A method for forming an electrode-lead assembly, said method comprising the steps of:
   aligning an energy outlet of an energy source with an end portion of the lead;
   operating the energy source so that the emitted energy heats the end of the lead and so that a melt is formed at the end portion of the lead; and
   allowing the melt to solidify, the solidified melt being bullet-shaped.

2. A method in accordance with claim 1 wherein said energy source is a laser.

3. A method in accordance with claim 2 wherein said laser comprises a Nd:YAG laser beam source.

4. A method in accordance with claim 2 wherein operating the energy source comprises the steps of:
   aligning a first laser beam outlet of the laser with the end portion of the lead; and
   operating the laser so that a first laser beam pulse emitted from the first laser beam outlet impinges upon the lead end portion.

5. A method in accordance with claim 4 wherein said first laser beam pulse has a wavelength of 1.06 micrometers.

6. A method in accordance with claim 4 further comprising the steps of:
   aligning a second laser beam outlet of the laser with the end portion of the lead; and
   operating the laser so that a second laser beam pulse emitted from the second laser beam outlet impinges upon the lead end portions.

7. A method in accordance with claim 6 wherein said laser comprises a Nd:YAG laser beam source coupled to a beam splitter for splitting a beam pulse output from the laser source into at least two respective beam pulses.

8. A method for forming an electrode-lead assembly, said method comprising the steps of:
   operating an energy source relative to the lead so that the energy source output heats a section of the lead; and
   applying a tensile force from opposing ends of the lead, two respective and separate lead portions being formed from the lead subsequent to application of the energy and tensile force.

9. A method in accordance with claim 8 wherein said energy source is a laser.

10. A method in accordance with claim 9 wherein said laser comprises a Nd:YAG laser beam source.

11. A method in accordance with claim 9 wherein operating the energy source comprises the steps of:
    aligning a first laser beam outlet of the laser with the end portion of the lead; and
    operating the laser so that a first laser beam pulse emitted from the first laser beam outlet impinges upon the lead end portion.

12. A method in accordance with claim 11 wherein said first laser beam pulse has a wavelength of 1.06 micrometers.

13. A method in accordance with claim 11 further comprising the steps of:
    aligning a second laser beam outlet of the laser with the end portion of the lead; and
    operating the laser so that a second laser beam pulse emitted from the second laser beam outlet impinges upon the lead end portion.

14. A method in accordance with claim 13 wherein said laser comprises a Nd:YAG laser beam source coupled to a beam splitter for splitting a beam pulse output from the laser source into at least two respective beam pulses.

15. A method in accordance with claim 8 wherein the tensile force is applied subsequent to heating the lead.

16. A method in accordance with claim 8 wherein the tensile force is applied simultaneously with heating the lead.

17. A method in accordance with claim 8 wherein said energy source is a coil.

18. A method for forming an electrode-lead assembly, said method comprising the steps of:
    abutting a first end of the lead to a first end of a seed wire to form a first interface;
    aligning an energy outlet of an energy source with the first interface;
    operating the energy source sot ht the emitted energy heats the seed wire and the lead at the interface and so that a melt is formed;
    axially displacing the seed wire from the lead; and
    allowing the melt to cool.

19. A method in accordnac with claim 18 wherein said energy source is a laser.

20. A method in accordance with claim 19 wherein said laser comprises a Nd:YAG laser beam source.

21. A method in accordance with claim 19 wherein operating the energy source comprises the steps of:
    aligning a first laser beam outlet of the laser with the end portion of the lead; and
    operating the laser so that a first laser beam pulse emitted from the first laser beam outlet impinges upon the lead end portion.

22. A method in accordance with claim 21 wherein said first laser beam pulse has a wavelength of 1.06 micrometers.

23. A method in accordance with claim 21 further comprising the steps of:
    aligning a second laser beam outlet of the laser with the end portion of the lead; and
    operating the laser so that a second laser beam pulse emitted from the second laser beam outlet impinges upon the lead end portion.

24. A method in accordance with claim 23 wherein said laser comprises a Nd:YAG laser beam source coupled to a beam splitter for splitting a beam pulse output from the laser source into at least two respective beam pulses.

25. A method for shaping respective electrode ends, said method comprising the steps of:
    disposing a first and a second electrode so that the respective electrode ends are spaced from each other and no objects are disposed in a path directly between the respective electrode ends;
    applying a voltage to the respective electrodes so that an arc is formed between the respective electrode ends; and
    removing the voltage being applied to the respective electrodes once a desired electrode end shape has been formed as a result of the removal of material from the electrode ends due to the arc.

* * * * *